Patented May 15, 1945

2,376,291

UNITED STATES PATENT OFFICE 2,376,291

PROCESS OF RENDERING MATERIALS GERMICIDAL AND GERMICIDE THEREFOR

Frank J. Sowa, Cranford, N. J.

No Drawing. Application December 8, 1941,
Serial No. 422,106

8 Claims. (Cl. 167—30)

The invention relates in general to germicides and in particular to compositions for treating materials such as textiles, paper, leather, rubber and the like to render them bacteriostatic and fungistatic and to germicidal paints, lacquers and cosmetics.

Germicides for use on materials such as textiles, paper, leather, rubber and the like must be characterized by a number of essential properties, the combination of which in a single chemical compound is difficult to attain. The most essential requisite is that the germicide should have a high toxicity to fungi and bacteria in very dilute solution so that the maximum protection will be obtained with a minimum quantity of material. Consequently, it is essential that a germicide for treating such material should be soluble in a common, inexpensive, readily available solvent, preferably soluble in water or in ethyl alcohol, methyl alcohol and other common solvents. The third essential characteristic for germicides for such materials is that they must be non-irritating to the human skin when used in wearing apparel or in cosmetics. Other desirable characteristics in a germicide for such materials is that they should not substantially discolor the treated materials. They should be stable upon a long exposure to sunlight and should not chemically react with the treated materials in an adverse manner. The combination of all these properties in a single chemical compound is obviously difficult of attainment.

It is the general object of the present invention to provide a germicide which is characterized by having high toxicity to bacteria and fungi in low concentration, solubility in common solvents and substantially no irritation for the skin.

It is the specific object of the invention to provide a composition for treating textiles, paper, leather, rubber and the like to render such materials highly bacteriostatic and fungistatic.

Other objects of the invention will in part be obvious and will in part appear hereinafter.

According to the present invention, a germicide having all the desired characteristics above mentioned comprises as a class all organic mercurial compounds having the following general formula:

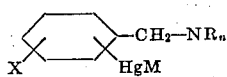

in which N represents nitrogen, R is an alkyl or aralkyl group and $n$ has the value 1 or 2 and when $n$ is 1 the remaining nitrogen valence is satisfied by hydrogen, and when $n$ is 2 the R's may represent the adjacent carbons in a ring, X represents from one to four hydrogen or halogen atoms or hydroxyl or alkyl groups, Hg represents mercury, M represents a hydroxyl group or an anion of an inorganic or organic acid or an alkyl or aryl group, and there may be used also the pentavalent nitrogen salts of the above general compound, which salts may be derived from inorganic or organic acids. In their preferred form the germicides of the invention comprise compounds of the above class in which X is an hydroxyl group.

As shown by the general formula, the germicides of the invention are secondary or tertiary amines in which one of the organic radicals attached to the nitrogen atom is a benzyl group containing nuclear-substituted mercury. The compounds have novel and unusual germicidal properties due to the conjoint presence of both nitrogen and mercury in the compound.

In general these new germicidal compounds can be prepared by first condensing benzyl alcohol or benzyl halide with a primary or secondary amine and thereafter treating the product with an inorganic or organic mercury salt or with an alkyl or aryl substituted mercury salt.

The benzyl radical can be derived from benzyl alcohol or a benzyl halide or from dibenzyl alcohol or halide, the condensation with the amine resulting in the elimination of water or a hydrogen halide, respectively for example, as follows:

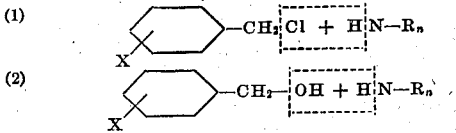

Alternatively, the benzyl group may be obtained by reacting a phenol with the amine in the presence of formaldehyde or para-formaldehyde, the condensation resulting in the production of benzyl amine and the elimination of water. Other processes of preparing the benzyl amine part of the present compounds may be devised by those skilled in the art without transcending the scope of the present invention.

The amine radical can be obtained by employing in the above reactions, any one of the class of alkyl, alkylol, aryl or aralkyl primary or secondary amine such for example, as methyl amine, diethyl amine, ethanol amine, diethanol amine, melamine, aniline, phenylene diamine, toluidine, xylidine, methyl aniline, dimethyl aniline, benzylamine; naphthalimine and the like; also by employing, in the above reactions, one of the class of heterocyclic nitrogen compounds in which the nitrogen is contained in the ring and $R_2$ represents the adjacent carbon atoms of the ring, such for example as the imides, e. g., phthalimide, the pyroles, the pyridines, the quinolines, the acridines, the azines e. g., morpholine, the diazines, e. g., pyrazine, the indoles and the like. Thus, it is noted that the organic nitrogen compounds used in preparing the germicide of the invention comprise any member of the three general classes, viz:

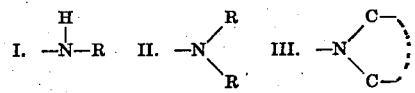

In the general formula where $n$ has the value 1, the third valence of nitrogen is of course, occupied by hydrogen.

The mercurial radical may be derived from any of the mercury salts of inorganic acids such for example as nitric, hydrochloric, sulphuric and the like, and mercury salts of aliphatic organic acids such, for example as acetic, citric, lactic and the like. The mercury radical can be derived also from compounds having the general formula

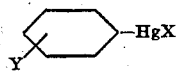

in which X is a hydroxyl group or an anion of an inorganic or organic acid such as those just mentioned and Y is a halogen or a nitro, alkyl, or hydroxy group, suitable compounds being, for example, phenyl mercuric acetate, phenol mercuric nitrate, phenyl mercury hydroxyd and the like. In the specification and claims, the term "mercury" is employed in a generic sense to designate mercury in any of its valence states as in mercurous and mercuric salts.

By way of illustrating but not by way of limiting the invention there will be given the following specific examples of methods for preparing the new germicides:

*Example I*

In a vessel provided with a reflux condenser there is placed a mixture of 94 grams of phenol and 89 grams of morpholine. Then add slowly 90 grams paraformaldehyde. The mixture is warmed gently until the reaction stops, after which any water and excess formaldehyde is distilled off. There is then added to the vessel containing the reaction product, 259.6 grams of mercuric acetate and a small amount of acetic acid, and the mixture stirred while carefully controlling the heating. When the reaction is complete, the acetic acid formed is distilled off under reduced pressure. The germicidal product has the formula:

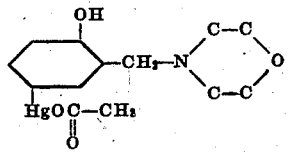

*Example II*

To a mixture of 162 grams of para-tertiary amyl phenol and 45 grams of dimethyl amine there is added 30 grams of formaldehyde in a vessel provided with a reflux condenser until the reaction has ceased. The water is distilled off and there is added to the product remaining in the vessel, 259.6 grams of mercuric acetate and the mixture heated gently for 1 hour after which the acetic acid by-product is distilled off under reduced pressure. The germicide produced has the formula:

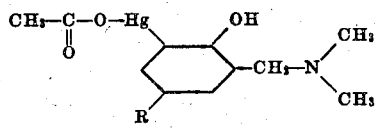

in which R represents the iso-amyl radical.

*Example III*

To one mole of the germicidal compound produced according to Example II, there is added, with gentle heating, 94 grams of phenol, whereupon acetic acid is eliminated and the following compound produced:

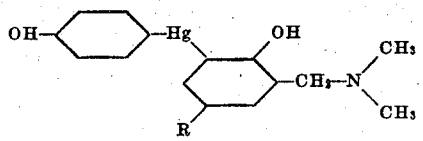

*Example IV*

126.5 grams of benzyl chloride are treated with 45 grams of ethyl amine to produce benzyl ethyl amine with the elimination of hydrochloric acid. The benzyl ethyl amine is then treated with 336.6 grams of phenyl mercuric acetate, the reaction producing acetic acid and the following germicidal compound:

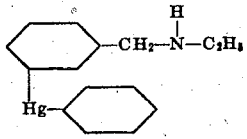

The new germicidal compounds thus far described are soluble in numerous organic solvents such as alcohols, toluene and pyridine, by which they can be added to lacquers, paints, plastics and the like. However, these compounds are generally insoluble or only slightly soluble in water. To increase their water-solubility the germicidal compound is mixed with an aqueous solution of a water-soluble inorganic or organic acid and the water evaporated by heating, whereupon the acid adds to the nitrogen in the compound. Suitable inorganic acids are, for example, hydrochloric, sulfuric, phosphoric and the like, and suitable organic acids are, for example, acetic, lactic, propionic, citric and the like.

*Example V*

To any of the germicidal compounds produced according to Examples I to IV inclusive, there is added an aqueous solution containing one mole of phosphoric acid. Upon evaporation of the water the phosphoric acid salt of the germicidal compound is produced, the phosphoric acid adding to the nitrogen which becomes pentavalent, e. g.,

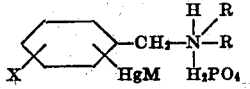

The new germicide of the invention may be used for coating, impregnating or finishing various materials especially textiles, paper, leather, foils and articles formed from these materials, such for example as garments, bandages, surgical dressings, tent cloth, uniforms, corsets, girdles, upholstery material, dress shields and many other articles. The germicide of the invention may be dissolved in water, alcohol or other suitable solvents and applied to material to be treated by spraying, padding, dipping, back-filling or by any other suitable method. In the case of non-fibrous foils, the material may be incorporated in the plastic mass and the plastic material extruded in the form of filaments, fabrics, bristles, films, foils, tubing and the like.

The germicides of the invention advantageously may be added to paints, lacquers, and other coating compositions, and incorporated in cosmetics such for example as hair tonics, salves, cold creams and the like.

I claim:

1. A composition having germicidal properties and comprising an organic mercurial compound having the following general formula:

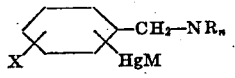

in which N represents nitrogen, R is selected from the group consisting of alkyl and aralkyl radicals, and $n$ is a whole number not greater than two, and when $n$ is one, the remaining nitrogen valence is satisfied by hydrogen, and when $n$ is two, the R's represent the adjacent carbon atoms in a ring, X represents from one to four substituents selected from the group consisting of hydrogen, halogen, hydroxyl and alkyl groups, Hg represents mercury, and M is selected from the group consisting of hydroxyl, the anion of an acid, alkyl and aryl groups.

2. A composition having germicidal properties and comprising a pentavalent nitrogen salt of an organic mercurial having the following general formula:

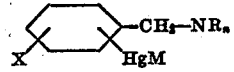

in which N represents nitrogen, R is selected from the group consisting of alkyl and aralkyl radicals, and $n$ is a whole number not greater than two, and when $n$ is one, the remaining nitrogen valence is satisfied by hydrogen, and when $n$ is two, the R's represent the adjacent carbon atoms in a ring, X represents from one to four substituents selected from the group consisting of hydrogen, halogen, hydroxyl and alkyl groups, Hg represents mercury, and M is selected from the group consisting of hydroxyl, the anion of an acid, alkyl and aryl groups.

3. A composition having germicidal properties and comprising an organic mercurial having the following general formula:

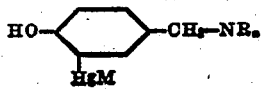

in which N represents nitrogen, R is selected from the group consisting of alkyl and aralkyl radicals, and $n$ is a whole number not greater than two, and when $n$ is one, the remaining nitrogen valence is satisfied by hydrogen, and when $n$ is two, the R's represent the adjacent carbon atoms in a ring, Hg represents mercury, and M is selected from the group consisting of hydroxyl, the anion of an acid, alkyl and aryl groups.

4. A composition having germicidal properties and comprising an organic nitrogen compound having the following general formula:

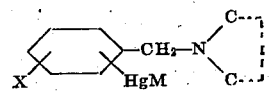

in which X represents from one to four substituents selected from the group consisting of hydrogen, halogen, hydroxyl and alkyl groups, Hg represents mercury, and M is selected from the group consisting of hydroxyl, the anion of an acid, alkyl and aryl groups.

5. A process of rendering materials germicidal comprising combining the materials with an organic mercurial compound as claimed in claim 1.

6. A process for rendering materials germicidal comprising treating said materials with a salt of an organic mercurial compound as claimed in claim 2.

7. A product having germicidal properties and represented by the following formula:

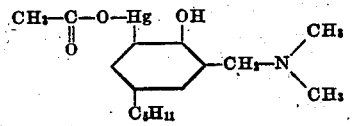

8. A composition having germicidal properties and represented by the following general formula:

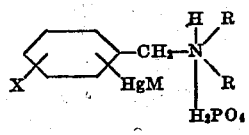

in which N represents nitrogen, R is selected from the group consisting of alkyl and aralkyl groups, X represents from one to four substituents selected from the group consisting of hydrogen, halogen, hydroxyl and alkyl groups, Hg represents mercury, and M is selected from the group consisting of hydroxyl, the anion of an acid, alkyl and aryl groups.

FRANK J. SOWA.